United States Patent
Akita et al.

(10) Patent No.: US 7,283,598 B2
(45) Date of Patent: Oct. 16, 2007

(54) OFDM RECEIVER APPARATUS

(75) Inventors: Koji Akita, Yokohama (JP); Kazumi Sato, Kawasaki (JP); Ren Sakata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 646 days.

(21) Appl. No.: 10/813,014

(22) Filed: Mar. 31, 2004

(65) Prior Publication Data

US 2004/0258171 A1 Dec. 23, 2004

(30) Foreign Application Priority Data

Mar. 31, 2003 (JP) ............................. 2003-096947
Mar. 26, 2004 (JP) ............................. 2004-093616

(51) Int. Cl.
H04L 27/00 (2006.01)
H04L 7/00 (2006.01)
H04L 27/06 (2006.01)
H03H 7/30 (2006.01)
H04J 11/00 (2006.01)

(52) U.S. Cl. ...................... 375/316; 375/354; 375/233; 375/340; 370/208; 370/210

(58) Field of Classification Search ................ 375/316, 375/340, 230, 232, 233, 346, 285, 354, 362–368; 370/203, 208, 210, 503, 509–514, 526
See application file for complete search history.

(56) References Cited

U.S. PATENT DOCUMENTS 5,889,759 A  3/1999 McGibney
6,862,262 B1 * 3/2005 Imamura .................... 370/210
6,928,120 B1 * 8/2005 Zhang ........................ 375/260
7,058,002 B1 * 6/2006 Kumagai et al. ........... 370/203
2004/0101073 A1 * 5/2004 Doi ............................ 375/343

FOREIGN PATENT DOCUMENTS

JP  2000-286819  10/2000

OTHER PUBLICATIONS

Yi-Hsin Yu et al., "A Joint Scheme of Decision-Directed Channel Estimation and Weighted Average Phase Error Tracking for OFDM WLAN System," IEEE, Asain Pasific Conference, 204, pp. 985-988.*

* cited by examiner

Primary Examiner—Tesfaldet Bocure
(74) Attorney, Agent, or Firm—Oblon, Spivak, McClelland, Maier & Neustadt, P.C.

(57) ABSTRACT

An OFDM receiver apparatus comprises a receiver to receive an OFDM signal, an estimator to estimate a distortion, a distortion compensator subjecting the sub-carrier to distortion compensation according to a control signal to generate a distortion-compensated sub-carrier, a demodulator to demodulate the distortion-compensated sub-carrier, an estimator to generate first phase distortion information, using the distortion-compensated sub-carrier and the distortion information, a weighting synthesizer to weight the first phase distortion information by weighting factors with time function over symbol intervals and then synthesize the first phase distortion information, to generate second phase distortion information, and a control signal generator to generate the control signal using the distortion information and the second phase distortion information.

19 Claims, 4 Drawing Sheets

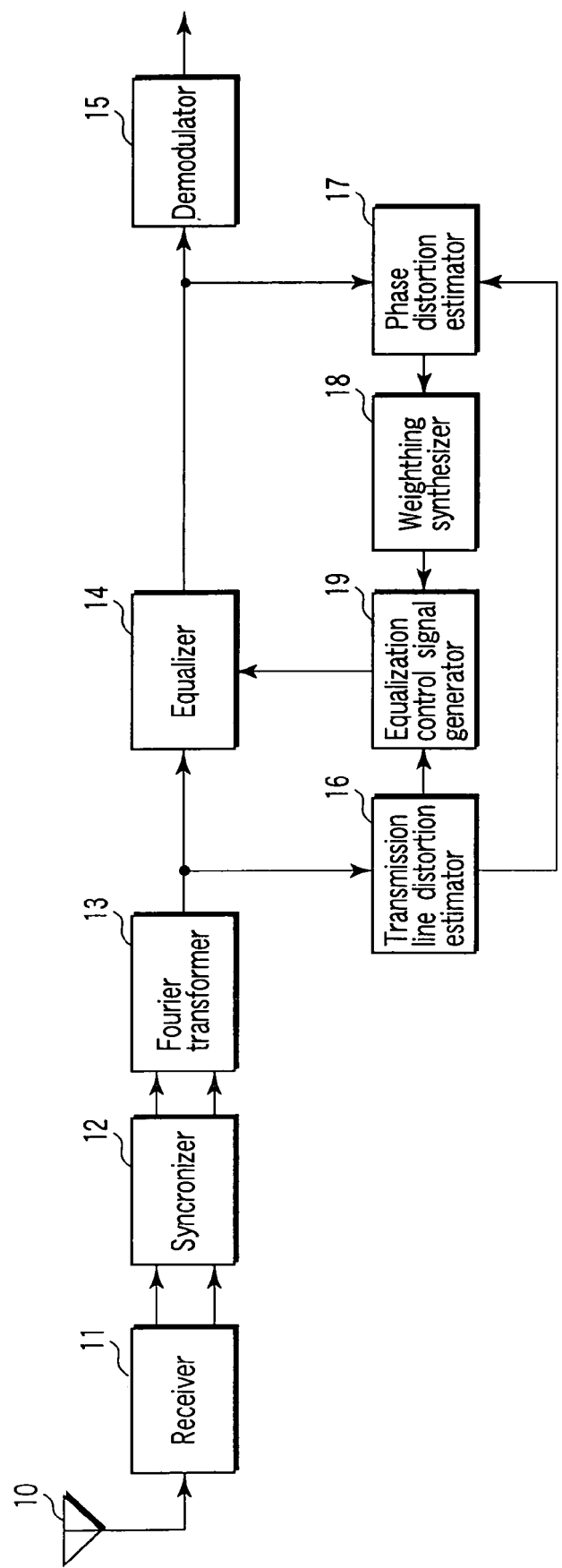
F I G. 1

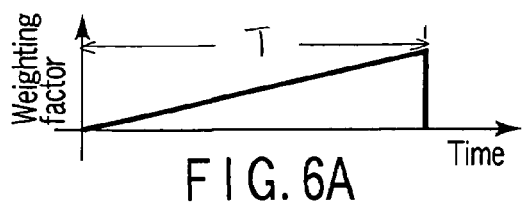
F I G. 6A
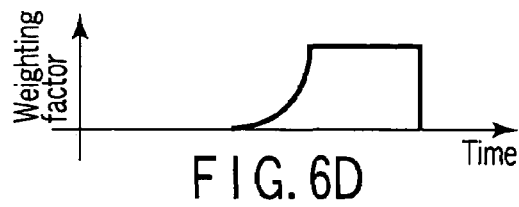
F I G. 6D
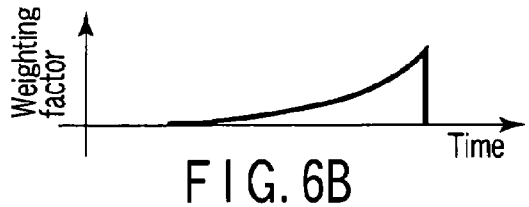
F I G. 6B
F I G. 6E
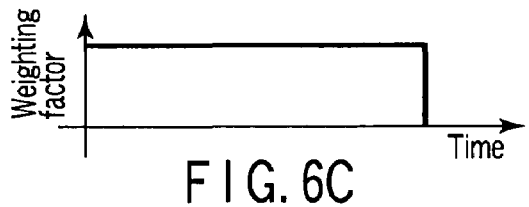
F I G. 6C
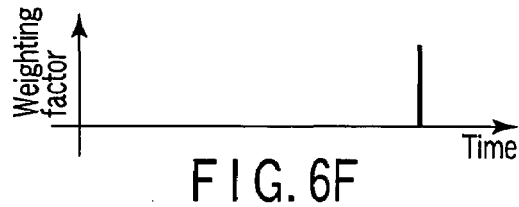
F I G. 6F
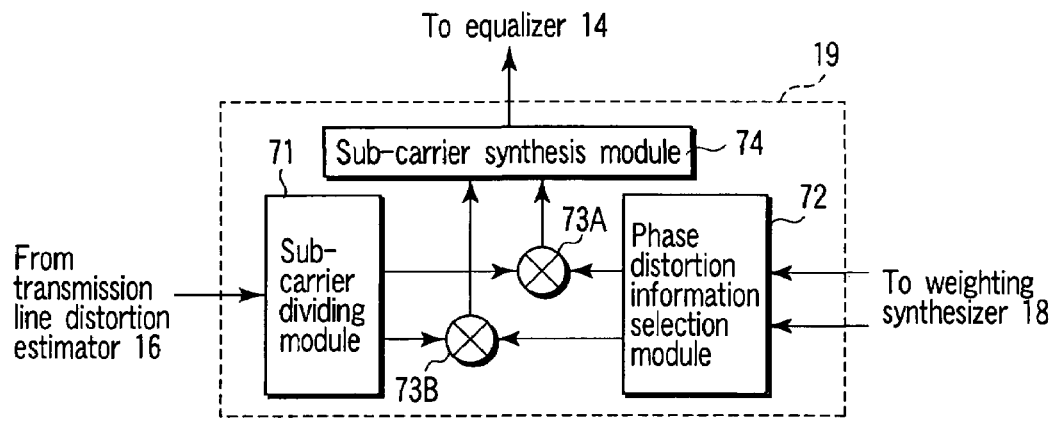
F I G. 7
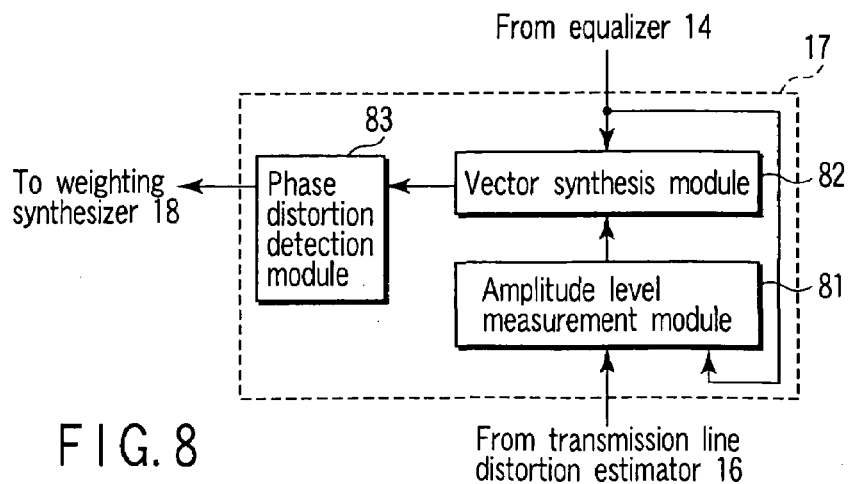
F I G. 8

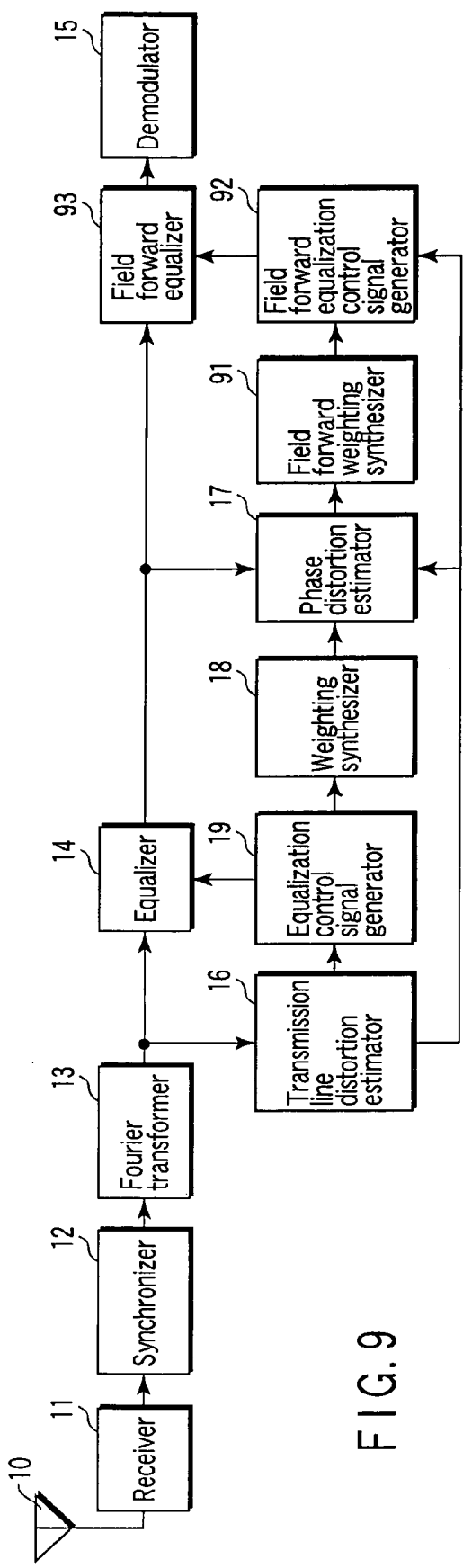
F I G. 9
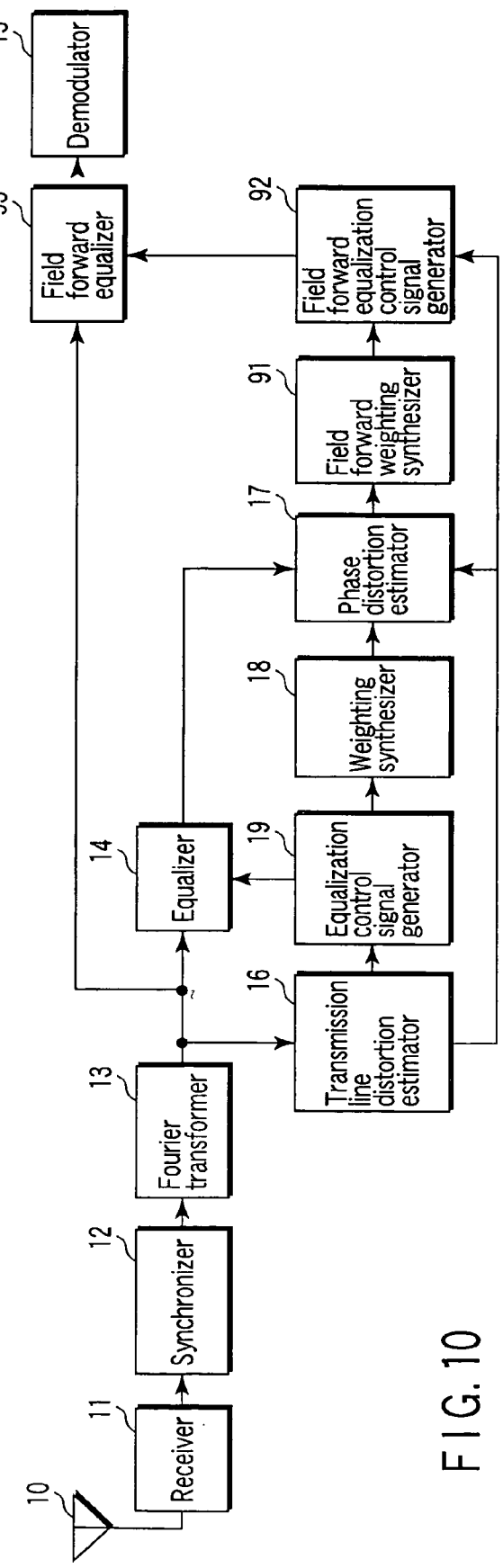
F I G. 10

OFDM RECEIVER APPARATUS

CROSS-REFERENCE TO RELATED APPLICATIONS

This application is based upon and claims the benefit of priority from prior Japanese Patent Applications No. 2003-096947, filed Mar. 31, 2003; and No. 2004-093616, filed Mar. 26, 2004, the entire contents of both of which are incorporated herein by reference.

BACKGROUND OF THE INVENTION

1. Field of the Invention

The present invention relates to an OFDM receiver apparatus that receives an OFDM (Orthogonal Frequency Division Multiplexing) signal and demodulates it. An OFDM system is one of multi-carrier modulation techniques for modulating data to be transmitted by dividing it into a plurality of sub-carriers. The OFDM system improves a multipass fading resistance property because each sub-carrier becomes a narrow-band. On the other hand, in the OFDM system, property degradation due to a phase rotation caused by a carrier frequency error, a clock displacement and a phase noise increases. For this reason, an estimation and compensation of phase distortion are necessary.

2. Description of the Related Art

According to the format of the OFDM signal, a synchronizing preamble to use in a synchronous process and a preamble to use for a channel estimation are arranged sequentially in beginning of a burst-shaped OFDM signal. The preambles are followed by data. The data is formed of one or more symbols. Each symbol comprises a plurality of sub-carriers. Several of the sub-carriers is known signal pilot sub-carriers, and the remaining ones thereof are data sub-carriers including data.

Japanese Patent Laid-Open No. 2000-286819 (patent document 1) discloses an example of an OFDM receiver which receives and demodulates such an OFDM signal. In this conventional OFDM receiver, the received burst OFDM signal is converted into a digital baseband signal, and subjected to a time synchronization process and a frequency synchronization process. Then, the signal is divided into a plurality of sub-carrier signals by a Fourier transformation. The sub-carrier signals are subjected to distortion compensation with an equalizer, and then sent to a demodulator to be demodulated. Phase error information common to each sub-carrier is generated using channel distortion information generated by the signal subjected to a Fourier transform and phase distortion information generated by the channel distortion information and demodulated data. Further, the phase error information is subjected to a moving average. An equalization control signal used for distortion compensation is generated with an equalizer, using the moving averaged phase error information and channel distortion information.

The equalizer carries out an equalization process including phase distortion compensation and channel distortion compensation. An estimation of the phase distortion that could not be compensated by the equalization process is done by means of a signal generated by the equalization process, to generate the above-mentioned phase distortion information. According to the patent document 1, in an estimation process of phase distortion, the phase distortion information is weighted every sub-carrier according to amplitude level information of each sub-carrier that is calculated based on the channel distortion information. The weighted phase distortion information items are synthesized. This weighted and synthesized phase distortion information is subjected to a moving average over a plurality of symbols.

As described above, in the conventional OFDM receiver, the phase distortion that could not be compensated with an equalizer was estimated using the phase-distortion compensated signal. Then, the phase distortion information is subjected to moving average over a plurality of symbols. As a result, estimation precision of phase distortion is improved. In such an OFDM receiver, when the phase distortion estimation precision deteriorates temporarily, the estimation precision degradation may occur for a long term after the phase distortion estimation by the moving average.

It is an object of the present invention to provide an OFDM receiver apparatus realizing highly precise phase distortion compensation.

BRIEF SUMMARY OF THE INVENTION

According to an aspect of the present invention, there is provided An OFDM receiver apparatus to receive an OFDM signal, comprising: a receiver to receive an OFDM signal having a plurality of sub-carriers every symbol; a distortion estimator which estimates a distortion using each sub-carrier of the sub-carriers of the OFDM signal to generate distortion information indicating the distortion; a distortion compensator which subjects the sub-carrier to distortion compensation according to a control signal to generate a distortion-compensated sub-carrier; a demodulator to demodulate the distortion-compensated sub-carrier; a phase distortion estimator to generate first phase distortion information indicating a phase distortion of each sub-carrier every symbol, using the distortion-compensated sub-carrier and the distortion information; a weighting synthesizer to weight the first phase distortion information by a plurality of weighting factors with time function over a plurality of symbol intervals and then synthesize the first phase distortion information, to generate a plurality of second phase distortion information; and a control signal generator to generate the control signal using the distortion information and the plurality of second phase distortion information.

BRIEF DESCRIPTION OF THE SEVERAL VIEWS OF THE DRAWINGS

FIG. 1 is a block diagram of an OFDM receiver according to an embodiment of the present invention.

FIGS. 6A to 6F show various examples of weighting factors used in a weighted synthesizer.

FIG. 7 is a block diagram of an equalization control signal generator in the embodiment.

FIG. 8 is a block diagram of another phase distortion estimator in the embodiment.

FIG. 9 is a block diagram of an OFDM receiver according to the second embodiment of the present invention.

FIG. 10 is a block diagram of a modification of the OFDM receiver according to the second embodiment of the present invention.

DETAILED DESCRIPTION OF THE INVENTION

Figure 2:
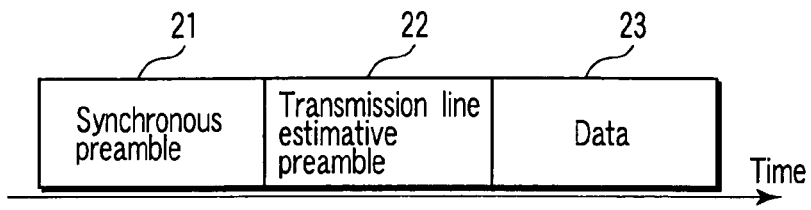
FIG. 2 shows a format of a burst OFDM signal.

There will now be described the embodiment of the present invention referring to the drawing.

FIG. 1 shows a configuration of an OFDM receiver apparatus related to an embodiment of the present invention. The burst OFDM signal transmitted from a transmission station via a radio channel is received by an antenna 10 and input to a receiver 11. According to a format of the received OFDM signal, a synchronous preamble 21 to use in a synchronous process and a channel estimation preamble 22 used for channel estimation are arranged sequentially in beginning of each burst as shown in FIG. 12.

The channel estimation preamble 22 is used not only for the channel estimation but also for a synchronization. The channel estimation preamble 22 is followed data 23 including one or more symbols.

Figure 3:
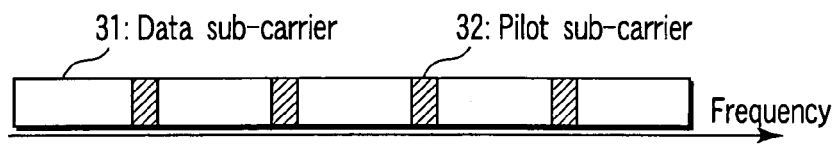
FIG. 3 shows a sub-carrier frequency distribution of a symbol.

FIG. 3 shows a frequency distribution of a sub-carrier signal in a symbol included in data 23 of FIG. 2. As shown in FIG. 3, the sub-carrier signal of this symbol section includes data sub-carriers 31 including data and known sub-carriers (as referred to as pilot sub-carriers) 32.

The receiver 11 converts the OFDM signal received via the antenna 10 into a digital baseband signal by amplifying, frequency-converting and analog-to-digital converting the OFDM signal. The digital baseband signal output from the receiver 11 is subjected to a time synchronization process and a frequency synchronization process by a synchronizer 12. The time synchronized and frequency synchronized OFDM signal is Fourier-transformed by a Fourier transformer 13 to be separated into a plurality of sub-carrier signals. Because configuration of the receiver 11, synchronizer 12 and Fourier transformer 13 are known, their detailed description is omitted.

Each sub-carrier signal output from the Fourier transformer 13 is equalized (distortion-compensated) by the equalizer 14 to remove channel distortion and phase distortion, and then input to a demodulator 15. As thus described, if the sub-carrier signal is passed through the equalizer 14 before demodulation, accurate demodulation is possible. The equalizer 14 equalizes the sub-carrier according to an equalization control signal supplied from an equalization control signal generator 19 described below. The equalization control signal is generated by the following procedure.

The channel estimation preamble 22 included in the received OFDM signal is separated into a plurality of sub-carriers via the receiver 11 synchronizer 12 and Fourier-transformer 13 similarly to other symbols included in the burst of the OFDM signal. A channel distortion estimator 16 generates channel distortion information using the sub-carrier signal of the channel estimation preamble 22. The channel distortion information expresses distortion that the received OFDM signal sustained in the channel. Information of amplitude distortion and phase distortion of every sub-carrier signal is included in the channel distortion. Because a concrete configuration of the channel distortion estimator 16 is known, the detailed description is omitted.

The channel distortion information output from the channel distortion estimator 16 is input to a phase distortion estimator 17 and an equalization control signal generator 19. The phase distortion estimator 17 estimates phase distortion every symbol of the OFDM signal using the channel distortion information from the channel estimator 16 and the distortion-compensated sub-carrier signal from equalizer 14. Thus, the phase distortion information (first phase distortion information) is generated every symbol.

Figure 4:
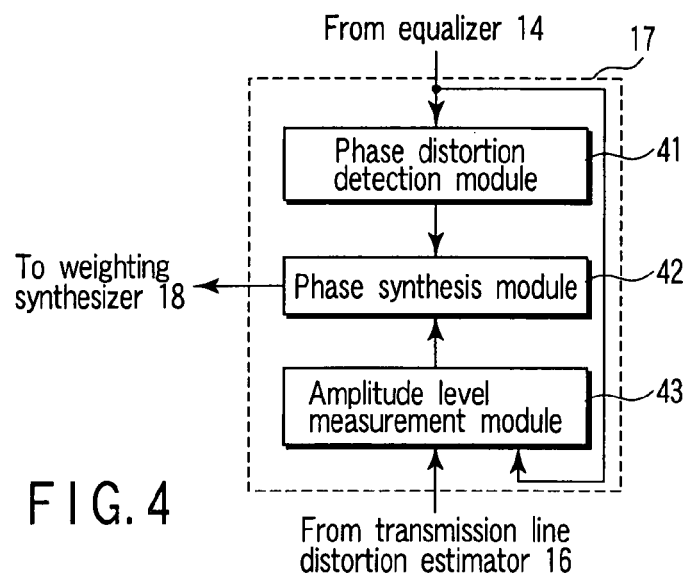
FIG. 4 is a block diagram of a phase distortion estimator in the embodiment.

FIG. 4 shows a concrete configuration of the phase distortion estimator 17. In the phase distortion estimator 17 of FIG. 4, at first, the phase distortion detection module 41 detects a phase error component between a pilot sub-carrier 32 of the distortion-compensated sub-carrier signal output from the equalizer 14 and a known sub-carrier prepared in the OFDM receiver. On the other hand, an amplitude level measurement module 43 measures the amplitude level of the distortion-compensated sub-carrier signal output from the equalizer 14 on the basis of the channel distortion information from the transmission distortion estimator 16 of FIG. 1, to output amplitude level information.

The phase synthesis module 42 weights the phase error component detected with the phase distortion detection module 41, using the amplitude level information output from amplitude level measurement module 43.

Phase distortion information for one symbol is generated by this weighting process and output from the phase distortion estimator 17. The phase distortion information output from the phase distortion estimator 17 is sent to the weighting synthesizer 18 of FIG. 1. The weighting synthesizer 18 carries out a weighting synthesis using a weighting factor (referring to as a weighting factor string) of a time function, to generate synthesis phase distortion information (second phase distortion information).

The weighting synthesis is to weight, by the weighting factor string, plural phase distortion information for a plurality of symbols input from the phase distortion estimator 17 and synthesize the weighted phase distortion information items to generate single phase distortion information. This operation of the weighting synthesis is repeatedly done every input of the phase distortion information for one new symbol. In synthesizing the weighted phase error information items for a plurality of symbols, if the weighted phase error information items are averaged, this is referred to as a weighted moving average. Consequently, the weighting synthesizer may be replaced for a weighted moving average unit.

Figure 5:
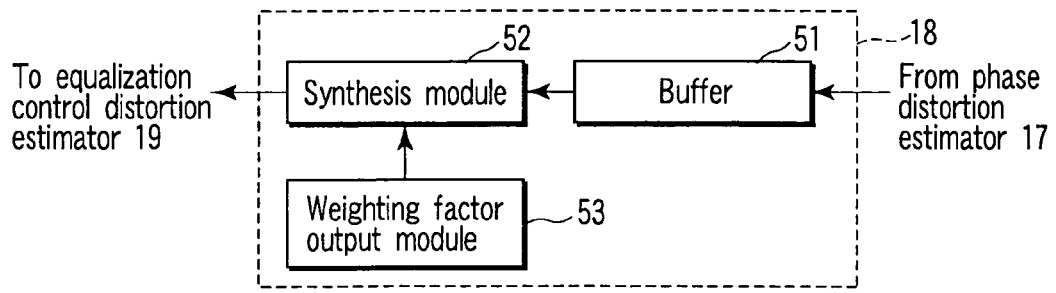
FIG. 5 is a block diagram which shows configuration example of a weighted complex circuitry in the embodiment.

FIG. 5 shows a concrete configuration of the weighting synthesizer 18. At first, plural phase distortion information for a plurality of symbols output from the phase distortion estimator 17 of FIG. 1 are stored in a buffer 51. A weighting factor output module 53 outputs simultaneously one or more weighting factors (weighting factor strings) of time functions as shown in FIGS. 6A to 6F, for example. In this weighting factor string, axis of ordinates indicates a time and a quadrature axis a value of weighting factor. The period T of the weighting factors shown in FIGS. 6A to 6F corresponds to an interval of a plurality of symbols stored in the buffer 51.

A synthesis module 52 subjects phase distortion information items for a plurality of symbols read from the buffer 51 to weighting synthesis (weighted moving average), using the weighting factor string output from the weighting factor output module 53, thereby to generate synthesis phase distortion information comprising of phase distortion information for a plurality of symbols. The weighting factor string output from the weighting factor output module 53 and the operation of the weighting synthesizer 18 will be describe in detail hereinafter.

The synthesis phase distortion information generated with the weighting synthesizer 18 is supplied to the equalization control signal generator 19 shown in FIG. 1. The equalization control signal generator 19 generates an equalization control signal to control the equalization property of the equalizer 14, using the channel distortion information from the channel estimator 16 and the synthesis phase distortion information from the weighting synthesizer 18 shown in FIG. 1.

FIG. 7 shows a concrete configuration of the equalization control signal generator 19. At first, a sub-carrier dividing module 71 divides the channel distortion information of each sub-carrier signal input from the channel estimator 16 of FIG. 1 into a plurality of groups (two groups in this example). A phase distortion information selection module 72 selects, from one or more synthesis phase distortion information items input from the weighting synthesizer 18, one synthesis phase distortion information item suitable for the channel distortion information of each of groups divided by the sub-carrier dividing module 71.

The synthesis phase distortion information selected by the phase distortion information selection module 72 is superposed on the channel distortion information of each group from the sub-carrier dividing module 71, by a plurality of superposition modules 73A and 73B corresponding to each group. The distortion information provided by the above process is output to the sub-carrier synthesis module 74. The distortion information output by the superposition modules 73A and 73B correspond to each group of sub-carriers. The sub-carrier synthesis module 74 synthesizes distortion information items corresponding to groups of sub-carriers output by the superposition modules 73A and 73B to make a symbol unit, and outputs it as an equalization control signal.

In this way, when the equalization process is done with the equalizer 14 using a generated equalization control signal, weighting factor used for weighting the phase distortion information in a past symbol can be freely set every sub-carrier. Therefore, adequate selection of the weighting factors makes temporary degradation of the phase distortion estimation precision decrease influence to the later estimation precision. As a result, highly precise phase distortion compensation can be realized.

The weighting synthesizer 18 will be concretely described hereinafter.

In the previously described phase distortion, there are two distortions, that is, distortion (steady phase distortion) superimposed in steady state on all symbols configuring a burst of OFDM signal and distortion (fluctuation phase distortion) fluctuating in time. The former is due to displacement of oscillation frequency (local frequency) of a local oscillator used for a frequency conversion of the OFDM receiver with respect to the carrier frequency of a transmission signal, and the latter is due to a phase noise occurring in the local oscillator. A string of weighting factors output from the weighting factor output module 52 of FIG. 5 is changed as shown in FIGS. 6A to 6F according to a ratio of steady phase distortion and fluctuation phase distortion to the whole phase distortion, thereby to generate synthesis phase distortion information having higher precision.

At first, when information on a ratio of the steady phase distortion to the fluctuation phase distortion in the phase distortion cannot be obtained sufficiently, it is desirable to use a string of weighting factors whose values decrease with a lapse of time as shown in FIG. 6A or 6B. In other words, a weighting factor of a small coefficient value is assigned to phase distortion information of a past symbol. It is possible to avoid a large risk by using such a weighting factor string.

When it is apparent that the steady phase distortion is comparatively larger than the fluctuation phase distortion in the ratio, it is desirable to assign a large coefficient value to the past weighting factor by using a weighting factor string having an approximately constant coefficient value in terms of time as shown in FIG. 6C or 6D. This way makes it possible to improve precision of the synthesis phase distortion information.

On the other hand, when it is apparent that the fluctuation phase distortion is comparatively larger than the steady phase distortion in the ratio, it is available to use a weighting factor string that a smaller coefficient value is assigned to the past weighting factor as shown in FIG. 6E. Alternatively, it is available to set all the past coefficient values to 0 and use the weighting factor string whose current weighting factor is set to a non-zero coefficient value as shown in FIG. 6F. This makes it possible to follow quickly the phase distortion fluctuating in time without being dragged in the past situation which has already varied.

The sub-carrier dividing module 71 shown in FIG. 7 divides channel distortion information corresponding to a pilot sub-carrier from the transmission path distortion information corresponding to each sub-carrier signal to make a first group. When the weighting factor string whose past coefficient value is small or 0 is applied to the channel distortion information of the first group as shown in FIG. 6E or 6F, for example, even if temporary deterioration of phase distortion estimation precision occurs, it can be effectively decreased that the degradation affects the later estimation precision.

On the other hand, the sub-carrier dividing module 71 divides channel distortion information corresponding to data sub-carrier to the second group. For channel distortion information of the second group may be used a weighting factor string having a flat value in terms of time as shown in FIG. 6C.

When a white noise is large independent of the ratio of the steady phase distortion to the fluctuation phase distortion with respect to the whole phase distortion, a method of decreasing a total value of the weighting factor string is thought. This prevents the synthesis phase distortion information from being significantly degraded in precision degradation due to the white noise, resulting in improving decode precision.

The weighting factor output module 53 shown in FIG. 5 may output one kind of weighting factor string selected from the weighting factor strings shown in FIGS. 6A to 6F over the whole burst of the OFDM signal. Alternately, it may output a different weighting factor every symbol. Further, the weighting factor output module 53 may output different kinds of weighting factor strings at the same time, and may output only one kind of weighting factor string.

There will be explained a concrete operation example of the equalization control signal generator 19 shown in FIG. 7.

Sub-carrier dividing network 71 divides channel distortion information corresponding to each sub-carrier signal into a first group corresponding to pilot sub-carriers and a second group corresponding to sub-carriers of other data sub-carriers and output them. On the other hand, the phase distortion information selection module 72 selects, from one or more synthesis phase distortion information input from the weighting synthesizer 18, synthesis phase distortion information appropriate respectively for the channel distortion information of the first and second groups divided by the sub-carrier dividing module 71.

For the purpose of decreasing that temporary degradation of estimation precision affects the later estimation precision with reference to the channel distortion information of the first group corresponding to the pilot sub-carrier, the phase distortion information selection circuit 72 selects the synthesis phase distortion information weighted and synthesized by the weighting factor whose past coefficient value is small as shown in FIG. 6E or 6F.

With reference to the channel distortion information of the second group corresponding to sub-carriers such as data sub-carriers other than pilot sub-carriers, synthesis phase distortion information weighted and synthesized by a weighting factor string set according to configuration of the phase distortion and level of white noise is selected by the phase distortion information selection module 72.

In the above cases, the same synthesis phase distortion information may be employed over the whole burst every sub-carrier. Also, the synthesis phase distortion information may be changed every symbol. In this way, when equalization process is carried out by the equalizer 14 according to an equalization control signal generated with the equalization control signal generator 19, only an equalization process using phase distortion information of a past symbol or comparatively a few symbols is done with reference to a pilot sub-carrier used for an estimation of phase distortion. This makes it possible to decrease that temporary degradation of estimation precision affects the later estimation precision. On the other hand, the data sub-carrier is subjected to the equalization process using the phase distortion information for a plurality of past symbols. Therefore, accurate equalization process can be realized.

Another configuration of the phase distortion estimator 17 will be described in conjunction with FIG. 8 hereinafter.

An amplitude level measurement module 81 extracts amplitude level information contained in channel distortion information input by the channel estimator 16. A vector synthesis module 82 weights and synthesizes the vector signal of each pilot sub-carrier included in a distortion-compensated received symbol output from the equalizer 14, using a component corresponding to the sub-carrier which the pilot sub-carrier is arranged, the component being one among the amplitude level information output from the amplitude level measurement module 81. A phase distortion detecting module 83 compares a vector signal synthesized with a vector synthesis module 82 with a known signal to generate phase distortion information for one symbol.

The phase distortion estimator 17 shown in FIG. 4 is compared with that shown in FIG. 8. The phase distortion detection module 41 of FIG. 4 detects phase distortion with respect to each of pilot sub-carriers 32 included in a phase-compensated received symbol. In contrast, the phase distortion detection module 83 of FIG. 8 detects phase distortion with respect to a vector signal synthesized with the vector synthesis module 82. Therefore, the phase distortion detection module of FIG. 4 is large in size by a multiple of the number of pilot carriers in comparison with that of FIG. 8. On the other hand, the vector synthesis circuitry 82 of FIG. 8 can be configured with a circuit size of around 2 times of that of the phase synthesis module 42 of FIG. 4. Consequently, the circuit size of FIG. 8 can be decreased in comparison with that of FIG. 4 with respect to the whole phase distortion estimator 17.

Another example of the phase distortion estimator carries out the same process by detecting a phase error component between a data sub-carrier signal and a signal estimated a data sub-carrier before sustaining distortion, can do a similar process, instead of detecting a phase error component between a pilot sub-carrier signal and a known signal. Each component of the OFDM receiver explained in the above embodiment does not have to be always hardware. A part or all of each process after, for example, a Fourier transformation may be realized by software.

(Second Embodiment)

FIG. 9 shows a configuration of an OFDM receiver according to the second embodiment of the present invention, wherein a feed forward weighting synthesizer 91, a feed forward equalization control signal generator 92 and a feed forward equalizer 93 are added to the configuration of the first embodiment.

In the first embodiment, control information for use in phase distortion compensation is generated with a phase distortion estimator 17, a weighting synthesizer 18 and an equalization control signal generator 19, using a corrected pilot sub-carrier 32 provided from the equalizer 14. However, a system from the equalizer 14 to the equalization control signal generator 19 becomes a feedback system. For this reason, the distortion compensation may be delayed by one symbol. As a result, a residual distortion for one symbol remains for a result of equalization. Consequently, in the second embodiments, the residual distortion is removed using the feed forward weighting synthesizer 91 disposed in a feed forward form and the feed forward equalization control signal generator 92.

In this embodiment, too, a burst-shaped OFDM signal transmitted via a radio channel from a transmitter is received by a radio antenna 10. The OFDM signal is synchronized with a synchronizer 12, and then converted into a sub-carrier signal with a Fourier transformer 13. Such a process is similar to the first embodiment. Further, a format of the received OFDM signal and a frequency distribution of a sub-carrier signal in a symbol included in data 23 are similar to the first embodiment.

Each sub-carrier signal output from the Fourier transformer 13 is subjected to an equalization process to remove channel distortion and phase distortion with an equalizer 14. The sub-carrier signal is input to the feed forward equalizer 93 to be subjected to an equalization process again, and then input to a demodulator 15. As thus described, the OFDM signal is subjected to distortion compensation twice to remove residual distortion. As a result, a demodulation can be more precisely carried out. The equalizer 14 carries out the same process as the first embodiment. The feed forward equalizer 93 carries out an equalization process according to an equalization control signal supplied from the feed forward equalization control signal generator 92. The equalization control signal is generated according to the following procedure.

The phase distortion information output from the phase distortion estimator 17 is sent not only to the feed forward weighting synthesizer 91 but also to the weighting synthesizer 18. The feed forward weighing synthesizer 91 does the same process as the weighting synthesizer 18 to generate synthesis phase distortion information for one symbol to lack in the feedback system.

The synthesis phase distortion information generated with the feed forward weighting synthesizer 91 is supplied to the feed forward equalization control signal generator 92. The feed forward equalization control signal generation circuitry 92 generates an equalization control signal to control an equalization property of the feed forward equalizer 93, using channel distortion information from the channel estimator 16 and the synthesis phase distortion information from the feed forward weighting synthesizer 91. The method of generating the equalization control signal in this case assumes the same as that in the equalization control signal generator 19.

The feed forward equalizer 93 corrects further the output of the equalizer 14 that has been already compensated by using the feedback information, using an equalization control signal output from the feed forward equalization control signal generator 92. The correction method is the same as the equalizer 14. In this embodiment, the operation of the feed forward weighting synthesizer 91 assumes the same as the weighting synthesizer 18. However, the weighting factor string may be differed between the feed forward weighting synthesizer 91 and the weighting synthesizer 18. Further, the equalizer may be constructed in a plurality of stages in order to carry out distortion compensation twice or more.

In addition, the present embodiment may be configured as shown in FIG. 10. In FIG. 10, an output of the Fourier transformer 14 is input to a direct feed forward equalizer. Consequently, the feed forward equalizer 93 is to compensate a distortion due to an equalizer of feedback system and a residual distortion. In this embodiment, the feed forward equalizer 93 to remove a residual distortion is added. Therefore, the embodiment is suitable for a case that a phase tracking is difficult in a feedback system of a device such as a receiver whose phase noise level is high.

According to the present invention as discussed above, it can be decreased that temporary degradation of estimation precision of phase distortion affects the later estimation precision, resulting in realizing phase distortion compensation of a high accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An OFDM receiver apparatus to receive an OFDM signal, comprising:
    a receiver to receive an OFDM signal having a plurality of sub-carriers every symbol;
    a distortion estimator which estimates a distortion using each sub-carrier of the sub-carriers of the OFDM signal to generate channel distortion information;
    a distortion compensator which subjects the sub-carrier to distortion compensation according to a control signal to generate a distortion-compensated sub-carrier;
    a demodulator to demodulate the distortion-compensated sub-carrier;
    a phase distortion estimator to generate first phase distortion information indicating a phase distortion of each sub-carrier every symbol, using the distortion-compensated sub-carrier and the distortion information;
    a weighting synthesizer to weight the first phase distortion information by a plurality of weighting factors with time function over a plurality of symbol intervals and then synthesize the first phase distortion information, to generate a plurality of second phase distortion information; and
    a control signal generator to generate the control signal using the distortion information and the plurality of second phase distortion information.

2. An OFDM receiver apparatus according to claim 1, which further includes
    a converter to convert the received OFDM signal to a digital baseband signal;
    a synchronizer to synchronize the digital baseband signal with respect to a time and a frequency to generate a synchronized digital baseband signal; and
    a separation unit configured to separate the sub-carriers of the OFDM signal by subjecting the synchronized digital baseband signal to a Fourier transform.

3. An OFDM receiver apparatus according to claim 1, wherein the symbol includes a data sub-carrier and a known sub-carrier as the sub-carrier signal, the phase distortion estimator has a phase distortion information threshold, and weights and synthesizes a phase error component of the known sub-carrier of the distortion-compensated sub-carrier signal, and generates the first phase distortion information by clipping a weighted and synthesized component using the phase distortion information threshold.

4. The OFDM receiver apparatus according to claim 1, wherein the symbol includes a data sub-carrier and a known sub-carrier as the sub-carrier signal, and the weighting synthesizer uses as the plurality of weighting factors a first weighting coefficient and a second weighting coefficient which differ in coefficient value between an interval corresponding to the data sub-carrier and an interval corresponding to the known sub-carrier.

5. The OFDM receiver apparatus according to claim 1, wherein the symbol includes signal of data sub-carrier and a known sub-carrier as the sub-carrier signal, and the weighting synthesizer uses a first weighting factor whose value is substantially constant in time in an interval corresponding to the data sub-carrier, and a second weighting factor whose past coefficient value is small relatively in an interval corresponding to the known sub-carrier.

6. The OFDM receiver apparatus according to claim 1, wherein the symbol includes a data sub-carrier and a known sub-carrier as the sub-carrier signal, the weighting synthesizer generates the second phase distortion information using as the plurality of weighting factors a first weighting coefficient and a second weighting coefficient which differ in coefficient value between an interval corresponding to the data sub-carrier and an interval corresponding to the known sub-carrier, and the control signal generator generates the control signal by the second phase distortion information generated by the weighting synthesizer using the first weighting factor in the interval corresponding to the data sub-carrier, and generates the control signal by the second phase distortion information generated by the weighting synthesizer using the second weighting factor in the interval corresponding to the known sub-carrier.

7. The OFDM receiver apparatus according to claim 1, which further comprises a residual distortion removing unit configured to remove a residual distortion from the distortion-compensated sub-carrier.

8. An OFDM receiver apparatus to receive an OFDM signal, comprising:
    a receiver to receive an OFDM signal having a plurality of sub-carriers;
    a distortion estimator which estimates a distortion by using each sub-carrier of the received OFDM signal, to generate distortion information indicating the distortion;
    a distortion compensator which subjects the sub-carrier to distortion-compensation according to a control signal to generate a distortion-compensated sub-carrier;
    a demodulator to demodulate the distortion-compensated sub-carrier;
    a phase distortion estimator which generates first phase distortion information indicating a phase distortion of the distortion-compensated sub-carrier every symbol, using the distortion-compensated sub-carrier and the distortion information;

a weighting moving average unit configured to subject the phase distortion information to weighted moving average by using a weighting factor with time function over a plurality of symbol intervals, to generate second phase distortion information; and a control signal generator to generate the control signal by the distortion information and the second phase distortion information.

9. An OFDM receiver apparatus according to claim 8, which further includes a converter to convert the received OFDM signal to a digital baseband signal;

a synchronizer to synchronize the digital baseband signal with respect to a time and a frequency to generate a synchronized digital baseband signal; and a separation unit configured to separate the sub-carriers of the OFDM signal by subjecting the synchronized digital baseband signal to a Fourier transform.

10. An OFDM receiver apparatus according to claim 8, wherein the symbol includes a data sub-carrier and a known sub-carrier as the sub-carrier signal, the phase distortion estimator has a phase distortion information threshold, and weights and synthesizes a phase error component of the known sub-carrier of the distortion-compensated sub-carrier signal, and generates the first phase distortion information by clipping a weighted and synthesized component using the phase distortion information threshold.

11. A OFDM receiver apparatus according to claim 8, wherein the weighting moving average unit includes a selector to select the weighting factor from a plurality of weighting factor candidates of a plurality of time functions.

12. The OFDM receiver apparatus according to claim 8, wherein the symbol includes a data sub-carrier and a known sub-carrier as the sub-carrier signal, and the weighting moving average unit uses as the weighting factor a first weighting coefficient and a second weighting coefficient which differ in coefficient value between an interval corresponding to the data sub-carrier and an interval corresponding to the known sub-carrier.

13. The OFDM receiver apparatus according to claim 8, wherein the symbol includes signal of data sub-carrier and a known sub-carrier as the sub-carrier signal, and the weighting moving average unit uses a first weighting factor whose value is substantially constant in time in an interval corresponding to the data sub-carrier, and a second weighting factor whose past coefficient value is small relatively in an interval corresponding to the known sub-carrier.

14. The OFDM receiver apparatus according to claim 8, wherein the symbol includes a data sub-carrier and a known sub-carrier as the sub-carrier signal, and the weighting moving average unit generates the second phase distortion information using as the weighting factor a first weighting coefficient and a second weighting coefficient which differ in coefficient value between an interval corresponding to the data sub-carrier and an interval corresponding to the known sub-carrier, and the control signal generator generates the control signal by the second phase distortion information generated by the weighting moving average unit using the first weighting factor in the interval corresponding to the data sub-carrier, and generates the control signal by the second phase distortion information generated by the weighting moving average unit using the second weighting factor in the interval corresponding to the known sub-carrier.

15. The OFDM receiver apparatus according to claim 8, which further comprises a residual distortion removing unit configured to remove a residual distortion from the distortion-compensated sub-carrier.

16. An OFDM receiver apparatus to receive an OFDM signal, comprising:

a receiver to receive an OFDM signal including a plurality of sub-carriers every symbol;

a channel distortion estimator which estimates a distortion using each sub-carrier of the sub-carriers of the OFDM signal to generate distortion information indicating the distortion;

a distortion compensator which subjects the sub-carrier to distortion compensation according to a control signal to generate a distortion-compensated sub-carrier;

a demodulator to demodulate the distortion-compensated sub-carrier;

a phase distortion estimator to generate first phase distortion information indicating a phase distortion of each sub-carrier every symbol, using the distortion-compensated sub-carrier and the distortion information;

a weighting synthesizer to weight the first phase distortion information by a plurality of weighting factors with time function over a plurality of symbol intervals and then synthesize the first phase distortion information, to generate a plurality of second phase distortion information corresponding to the weighting factors; and a control signal generator to generate the control signal using the channel distortion information and the plurality of second phase distortion information substantially to weight the sub-carriers by the weighting factors, individually.

17. An OFDM receiver comprising:

a receiver circuit configured to receive an OFDM signal including a plurality of sub-carriers every symbol;

a distortion evaluation circuit configured to evaluate a distortion using each of the sub-carriers of the OFDM signal, and generate channel distortion information;

a distortion compensation circuit to subject the sub-carriers to distortion compensation according to a control signal and to generate a plurality of distortion-compensated sub-carriers;

a demodulation circuit configured to demodulate the distortion-compensated sub-carriers;

a phase distortion estimation circuit configured to generate first phase distortion information indicating a phase distortion of each sub-carrier every symbol, using the distortion-compensated sub-carrier and the channel distortion information;

a weighting synthesis circuit configured to generate a plurality of second phase distortion information corresponding to a plurality of weighting factors by weighting the first phase distortion information using the weighting factors of a time function over a plurality of symbol intervals; and a control signal generation circuit configured to generate the control signal using the channel distortion information and the second phase distortion information in order to weight the sub-carriers by the weighting factors individually.

18. The OFDM receiver according to claim 17, wherein the distortion compensation circuit comprises a distortion compensation circuit to subject each sub-carrier signal to distortion-compensation plural times.

19. The OFDM receiver according to claim 18, wherein the distortion compensation circuit comprises a first equalizer to subject each sub-carrier signal from the receiver circuit to distortion compensation according to a first control signal and a second equalizer to subject an output signal of the first equalizer to distortion compensation according to a second control signal.

* * * * *